C. O. BENEDETTI AND A. P. AND W. VANSELOW.
PROCESS OF THE PRODUCTION OF AROMATIC ALDEHYDES AND THEIR SUBSTITUTION DERIVATIVES.
APPLICATION FILED MAY 5, 1920.
1,405,261.
Patented Jan. 31, 1922.
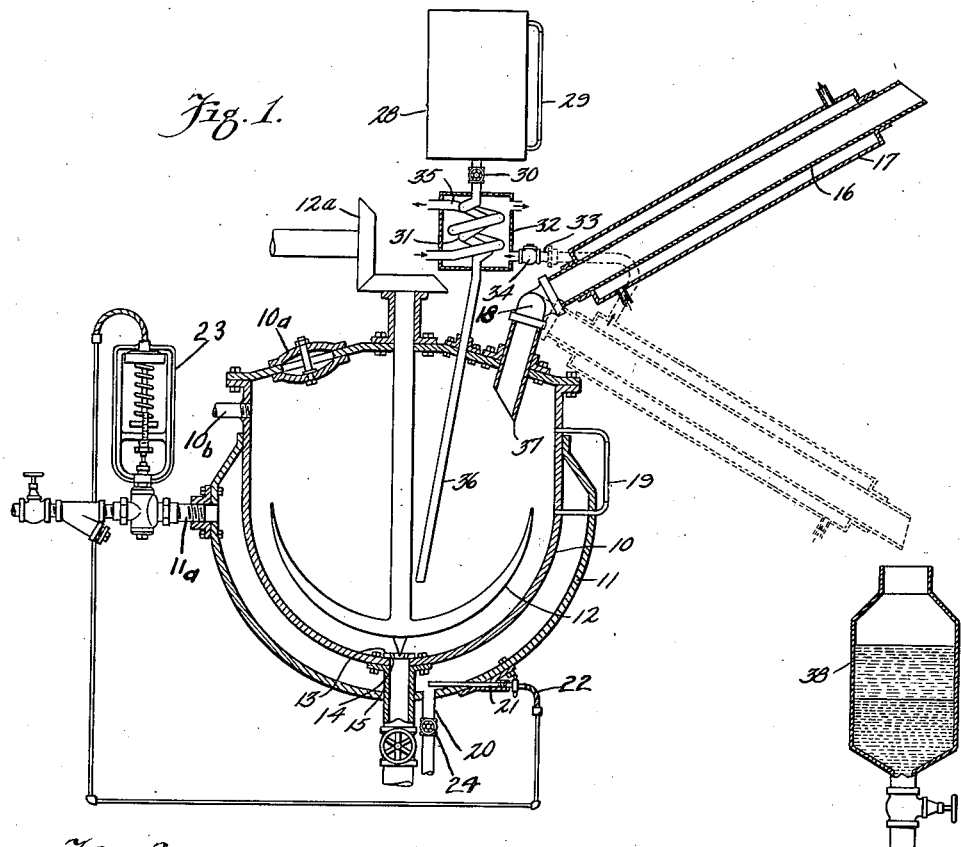
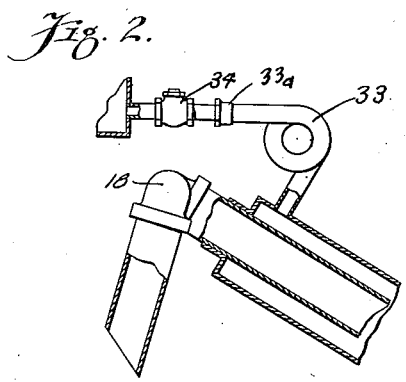
INVENTORS
C. OSCAR BENEDETTI,
ALBERT P. VANSELOW,
WALDEMAR VANSELOW.

UNITED STATES PATENT OFFICE.

CARLO OSCAR BENEDETTI, ALBERT P. VANSELOW, AND WALDEMAR VANSELOW, OF SYRACUSE, NEW YORK.

PROCESS OF THE PRODUCTION OF AROMATIC ALDEHYDES AND THEIR SUBSTITUTION DERIVATIVES.

1,405,261.  Specification of Letters Patent.  Patented Jan. 31, 1922.

Application filed May 5, 1920. Serial No. 379,183.

*To all whom it may concern:*

Be it known that we, CARLO OSCAR BENEDETTI, ALBERT P. VANSELOW, and WALDEMAR VANSELOW, citizens of the United States, and residents of Syracuse, county of Onondaga, and State of New York, have invented a certain new and useful Process of the Production of Aromatic Aldehydes and Their Substitution Derivatives, of which the following is a full, clear, and exact description.

This invention relates to a process and apparatus for the production of aldehydes and their derivatives, and has reference more particularly to the mono-halogen derivative of the corresponding aromatic hydrocarbon or its substitution derivative which is hydrolyzed by an aqueous-alkali solution to the corresponding primary alcohol, and this alcohol is then oxidized to the aldehyde by means of a hypochlorite solution.

While our invention is applicable to the production of many aromatic aldehydes and to their substitution derivatives, we will describe in detail the process and apparatus as applied to the manufacture of benzaldehyde from benzyl chloride. While the minor details of the process can be varied to a considerable extent and likewise the form of the apparatus altered in some respects, we will describe only a few processes and only one form of the apparatus to be used in carrying out our invention, illustrated in the accompanying drawing, in which—

Figure 1 is a vertical section through an apparatus which may be used in connection with our invention.

Figure 2 is a detail view on a large scale of the swivel connection on the condenser.

In the drawings we have shown a reaction chamber or vessel 10 having a steam jacket 11 which may conveniently be made of iron or any other suitable material and supplied with steam through a pipe $11_a$. The vessel 10 is also provided with an agitator 12 operated by gears $12_a$, which is preferably made of iron, said agitator resting upon a suitable bearing 13 having perforations 14 enabling it also to function as a strainer, the same being mounted over a bottom outlet pipe 15 of the reaction vessel 10 which pipe is used for drawing samples of the liquor and for emptying the vessel. The vessel 10 is also provided with a manhole $10_a$, an intake pipe $10_b$ and a condenser 16 surrounded by a water cooling jacket 17, said condenser being attached to the vessel 10 through a swivel joint 18 or other suitable device whereby said condenser can either be raised to the proper angle to act as a refluxing condenser, or it can be lowered to act as a distillation condenser (as shown by full and dotted lines respectively in Fig. 1), this condenser being made of cast iron or some other suitable material. The vessel 10 is fitted with a gauge glass 19 so that the level of the liquid in same can be seen at all times. The apparatus is insulated with 85% magnesia or some other suitable insulating material over which is applied a wood lagging or some other suitable material. A suitable outlet 20 is provided in the bottom of the steam jacket 11 for the discharge of condensation and any commercial temperature controlling mechanism can be positioned adjacent this outlet which may consist of a mercury filled capillary tube 21 connected to a diaphragm 22 which in turn operates a suitable adjustable valve 23 similar to those ordinarily used for controlling temperature. The valve 23 is positioned on the steam intake pipe $11_a$ so that when the temperature inside the steam jacket 11 falls below a predetermined point, the valve 23 will be automatically opened so that more hot steam will be introduced into the steam jacket thus maintaining the temperature thereof substantially constant. A steam trap 24 is provided on the outlet pipe 20 which removes the condensate from the steam jacket continuously.

A tank 28, also provided with a gauge glass 29, contains the hypochlorite solution and a hand valve 30 is used to regulate its flow. The hypochlorite solution is heated before passing into the vessel 10, by flowing through a coil 31 contained in a tank 32 into which the hot water coming from the water-cooled condenser jacket 17 discharges through a pipe 33 controlled by a check valve 34. Any quick detachable means, such as a union may be provided on the pipe 33 so that same may be quickly uncoupled. The water in the tank 32 may be heated still more by means of an auxiliary steam coil 35 and the heated hypochlorite solution is run into the reaction-chamber through the inlet pipe 36 which terminates below the liquor level.

We may for example carry out our process as follows:—

In the reaction-chamber 10 are introduced through the pipe $10_b$, 300 parts by weight of technical benzyl chloride, and 95 parts of solid caustic soda in 1,600 parts of water. This mixture is refluxed with strong agitation for several hours thereby hydrolyzing the benzyl chloride to benzyl alcohol. For this purpose the condenser 16 is elevated to a position above the horizontal as shown in full lines in Figure 1 by means of the swivel joint 18, so that it may function properly as a refluxing condenser. The tube connecting the swivel of the condenser to the reaction-vessel projects a short distance inward and its end 37 terminates at an angle as shown in Figure 1. After the hydrolysis of the benzyl chloride, the condenser is lowered below the horizontal so that it may function properly as a distillation condenser discharging into a separatory receiver 38 or other suitable receptacle. Into the tank 28 are poured 1,300 parts of sodium hypochlorite solution made by passing 230 parts of chlorine gas into a solution of 270 parts of solid caustic-soda in 800 parts of water. It is essential that the sodium hypochlorite solution contains not more than 2 or 3% of free sodium hydroxide, otherwise the amount of benzoic acid formed during the oxidation is greatly increased. As soon as water begins to distil over, the valve 30 is opened and the hypochlorite solution allowed to slowly run into the reaction vessel. The cooling water in the condenser 16 is so adjusted that when it comes out of the outlet pipe and discharges into the tank 32, it will have been heated almost to its boiling point. The valve 30 is so adjusted and the steam in the jacket 11 is now so regulated that, as the distillation proceeds and as the sodium hypochlorite solution is run in, the liquid level as seen in the gauge glass 19 will remain constant, providing the agitator is run at a uniform rate. The distillation is continued for some time after the last of the hypochlorite solution has been run in until only a very small amount of oil distills off with the water. The crude benzaldehyde in the receiver 38 is separated from the water layer and is purified in the usual manner.

The production of benzaldehyde by the oxidation of benzyl alcohol by means of a hypochlorite solution is made possible because of the great difference in the volatility with steam of benzyl alcohol and benzaldehyde. Thus 100 parts of water on being distilled carry over only about 4 parts of benzyl alcohol, while the same amount of water will carry over about 40 parts of benzaldehyde. Thus the benzaldehyde is distilled off almost as soon as formed while the benzyl alcohol remains behind to be oxidized to benzaldehyde.

After the distillation the water solution remaining in the reaction vessel is allowed to cool and drained out into a suitable receptacle through the pipe 15 where an excess of some suitable reducing material, such as sodium bisulfite, is added to destroy any sodium hypochlorite that may still be present. The benzoate formed is precipitated as benzoic acid by the addition of a slight excess of some suitable mineral acid, such as muriatic acid. The benzoic acid thereby precipitated is filtered off, washed, dried, and can be purified by sublimation. The water that has distilled over with the crude aldehyde is saturated with benzyl alcohol and is also quite warm, so that a saving is made in fuel and greater yields of benzaldehyde are obtained if this water is immediately used for the next charge.

Crude benzyl chloride (undistilled chlorinated toluene) can be used in the process provided that the amount of alkali used in the hydrolysis be not greatly in excess of the theoretical amount equivalent to the actual benzyl chloride content of the chlorinated oil. After the hydrolysis and just before the hypochlorite is allowed to run in, the toluene may be steam-distilled off, separated, dried with some suitable drying agent, and re-chlorinated.

The process can be carried out in some entirely different ways, for example:

The benzyl chloride mixed with caustic soda dissolved in water is agitated at a constant temperature of say 25 degrees to 75 degrees centigrade and the hypochlorite solution run in uniformly over a period of several hours. The crude benzaldehyde, after being separated off, is purified in the usual manner. The benzoic acid formed can be recovered out of the alkaline solution as described above.

The impure sodium chloride solution remaining after the benzoic acid has been filtered off can be purified by one or more recrystallizations, and then may be electrolyzed to give the sodium hypochlorite solution.

While we have described our invention above in detail, we wish it to be understood that many changes may be made therein, without departing from the spirit of our invention as defined in the appended claims.

One of the highly useful features of our invention is the removal of the aldehyde formed by the reaction before a substantial amount thereof is oxidized by the oxidizing agent; and by the expression "separating the aldehyde from the reaction mass as formed" we mean the separation of such aldehyde after its formation and before it has a chance to be oxidized to any great extent by the hypochlorite.

Having thus described our invention, we claim as new and desire to secure by Letters Patent:

1. A process for the production of aromatic aldehydes and their substitiution derivatives which consists in oxidizing a member of the class known as "phenyl carbinol and its substitution derivatives" to the corresponding member of the class known as "benzaldehyde and its substitution derivatives" by means of a hypochlorite solution, and separating the aldehyde as formed from the reaction mass.

2. A process for the production of aromatic aldehydes and their substitution derivatives which consists in oxidizing a member of the class known as "phenyl carbinol and its substitution derivatives" to the corresponding member of the class known as "benzaldehyde and its substitution derivatives" by means of a hypochlorite solution, and separating the aldehyde as formed from the reaction mass by distillation.

3. A process of the production of aromatic aldehydes and their substitution derivatives which consists in oxidizing a member of the class known as "phenyl carbinol and its substitution derivatves" to the corresponding member of the class known as "benzaldehyde and its substitution derivatives" by means of a hypochlorite solution, and separating the aldehyde as formed from the reaction mass by steam distillation.

4. A process for the production of a member of the class known as "benzaldehyde and its substitution derivatives" which consists in oxidizing the member of the class known as "phenyl carbinol and its substitution derivatives" by means of a hypochlorite solution, separating the aldehyde as formed by distillation and recovering the benzoic acid and its substitution products formed as by-products.

5. A process for the production of benzaldehyde and its substitution derivatives which consists in oxidizing a crude carbinol obtained by hydrolyzing crude undistilled chlorinated toluene and its substitution derivatives containing toluene, by means of a hypochlorite solution, separating the aldehyde as formed by distillation, and recovering by steam distillation the toluene present.

6. A process for the production of aromatic aldehydes and their substitution derivatives which consists in oxidizing a member of the group known as "phenyl carbinol and its substitution derivatives" by means of a hypochlorite solution. separating the aldehyde as formed by distillation, and recovering the corresponding aromatic acid formed as a by-product.

7. A process for the production of aromatic aldehydes and their substitution derivatives comprising oxidizing a member of the class known as "phenyl carbinol and its substitution derivatives" by means of a hypochlorite solution, separating the aldehyde as formed by distillation, separating the aldehyde from the water in the distillate, and utilizing said water cyclically in the production of additional aldehyde.

C. OSCAR BENEDETTI.
ALBERT P. VANSELOW.
WALDEMAR VANSELOW.